3,586,563

METHOD FOR PRODUCING AN OPTICAL FIBER BUNDLE

Filed June 10, 1969

INVENTORS
MASAHARU FUKAMI
HEIZABURO TAKAGI
BY TOSHIO NAKATSUBO

AGENT 3,586,563
METHOD FOR PRODUCING AN OPTICAL
FIBER BUNDLE
Masaharu Fukkami, Heizaburo Takagi, and Toshio
Nakatsubo, Tokyo, Japan, assignors to Olympus Optical
Co., Ltd., Tokyo, Japan
Filed June 10, 1969, Ser. No. 831,940
Int. Cl. G02b 5/16
U.S. Cl. 156—174                                      16 Claims

ABSTRACT OF THE DISCLOSURE

Method for producing an optical fiber bundle by winding at least one optical fiber element onto a drum while it is rotated in one direction so that a layer of the helically closely wound windings of the optical fiber element is formed on the drum. The optical fiber element is folded back upon itself at the end of the thus formed layer of the optical fiber element while the rotation of the drum is reversed so that a succeeding layer of the optical fiber element is formed on the preceding layer. The sense of the helical angle of the windings in each of the layers in thus kept the same.

The unit optical fiber bundles each having the cross-section in the form of a trapezoid or a regular triangle, the trapezoid having a bottom side the length of which is two times as long as that of the remaining three sides of the same length and opposite two side symmetrically inclined with respect to the center line of the cross-section with the included angle of 60° formed therebetween. The unit optical fiber bundles are bonded with each other at the respective ends thereof so as to form a composite optical fiber bundle having a large cross-sectional area.

Each of the unit optical fiber bundles comprises a plurality of optical fiber elements bonded with each other through the length thereof so that the cross-section of the same is made in the form of a triangle. The unit optical fiber bundles are bonded with each other at the respective ends thereof so that a composite optical fiber bundle having a large cross-sectional area is formed.

BACKGROUND OF THE INVENTION

The present invention relates to a method for producing an optical fiber bundle such as an image transmitting fiber optical system.

An optical fiber bundle such as an image transmitting fiber optical system comprises a plurality of fiber optical elements such as made of glass core fibers having a relatively high refracting index coated with light transparent substrance having a relatively low refracting index which fiber optical elements are bundled together with the arrangement of each of the optical fiber elements at the respective ends of the optical fiber bundle exactly corresponding to each other so as to transmit an image formed at one end surface of the fiber optical bundle therethrough to the opposite end surface of the optical fiber bundle without deteriorating the image.

Heretofore, such an optical fiber bundle has been produced by winding the optical fiber element onto a drum so as to form a number of layers comprising helically, closely wound windings of the optical fiber element superposed each other on the drum, fixing the thus formed layers of the optical fiber element at a circumferential position on the drum by means of a bonding agent and, thereafter, severing the layers at the fixed position thereof so that the opposite surfaces provided by the severing of the layers serve as the respective end surfaces of the optical fiber bundle, because the arrangement of each of the optical fiber elements at the respective end surfaces exactly corresponds to each other.

However, since the winding of the optical fiber element on the drum has been effected in the usual practice in such a manner that one layer of the optical fiber element is formed by feeding the optical fiber element axially of the rotating drum from one side to the opposite side and then the direction of the axial feeding of the optical fiber element is reversed at the end of the thus formed one layer so that the succeeding layer of the optical fiber element is formed on the previously formed layer in overlying relationship thereto and the above procedure is repeated so as to form a number of layers of the optical fiber element in overlying relationship to each other, the sense of the helical angle of the windings of the optical fiber element in one layer alternates from that of the adjacent layers, so that the light transmitted through each of the optical fiber elements in one layer from one end of the optical fiber bundle therethrough to the opposite end thereof is axially shifted relative to the light transmitted through the adjacent layers by the amount corresponding to the thickness of the optical fiber element thereby deteriorating the accuracy of the image transmitted through the optical fiber bundle.

In order to avoid the above described disadvantage, a method has been proposed in which one layer of the optical fiber element is formed by feeding axially the optical fiber element in one direction so as to helically wind the same on a rotating drum and, after the layer is completed, the optical fiber element is returned to the initial feeding position without forming any layer on the drum so that the succeeding layer is formed by feeding axially the optical fiber element in the same direction as that of the feeding of the optical fiber element in the formation of the preceding layer. However, such a method is extremely troublesome and lowers the efficiency of the production of the optical fiber bundle.

On the other hand, it has been very difficult to produce an optical fiber bundle having a large cross-sectional area. In order to facilitate the production of an optical fiber bundle having a large cross-sectional area, a method has been proposed in which a plurality of unit optical fiber bundles each having rectangular cross-section and the unit optical fiber bundles are assembled regularly so as to provide a composite optical fiber bundle.

However, it is necessary to utilize a groove formed in the peripheral surface of a rotating drum and having its opposite side walls located at right angle with respect to the bottom wall of the groove in order to wind the optical fiber element so as to form a unit optical fiber bundle having a rectangular cross-section. Therefore, it is very difficult to wind the optical fiber element regularly in the groove. Further, it is disadvantageous and inefficient to utilize the unit optical fiber bundles each having rectangular cross-section so as to form a composite optical fiber bundle having an effective cross-section in the circular form or the like because the area of the outer edges in cross-section of the assembled unit optical fiber bundles are superfluously incorporated when the unit optical fiber units are used in assembling the composite optical fiber bundle having the large cross-sectional area.

Further, it has been required for constructing a high quality optical fiber bundle to utilize a plurality of optical fiber elements each having a very small diameter, which optical fiber elements are arranged so that the arrangement of each of the optical fiber elements at the respective ends of the optical fiber bundle exactly corresponds to each other.

However, the production of the optical fiber bundle becomes more difficult and the tensile strength of the optical fiber element becomes very low as the diameter thereof is made smaller thereby resulting in the breakage of the optical fiber element in assembling or using the optical fiber bundle so that the performance of the optical fiber bundle is deteriorated.

The present invention aims at avoiding the disadvantages of the prior art methods of producing an optical fiber bundle.

SUMMARY OF THE INVENTION

An object of the present invention is to provide a novel and useful method for producing an optical fiber bundle such as an image transmitting fiber optical system in which the arrangement of each of the optical fiber elements at the respective ends of the optical fiber bundle corresponds exactly to each other.

Another object of the present invention is to provide a novel and useful method for producing an optical fiber bundle having a large cross-sectional area by assembling a plurality of unit optical fiber bundles each having a particular cross-sectional configuration so that a composite optical fiber bundle is formed which has desired cross-sectional configuration.

The above objects and other objects of the present invention which will be made clear from the following description are achieved in accordance with the characteristic feature of the present invention by forming a layer of helically, closely wound windings of the optical fiber element on a drum which is rotated in one direction by feeding the optical fiber element axially of the drum from one side to the other side, folding back the optical fiber element upon itself at the end of the thus formed layer of the optical fiber element while the direction of rotation of the drum is reversed so that a succeeding layer of the optical fiber element is formed in overlying relationship to the previously formed layer by feeding axially the optical fiber element from the above described other side to the original feeding position, and repeating the above described steps. Thus, the sense of the helical angle of the windings of each of the layers overlying each other is made the same so that, when the layers are bonded at a position on the drum and severed to provide the opposite two end surfaces of the thus formed optical fiber bundle, the arrangement of each of the optical fiber elements at the respective ends of the optical fiber bundle is made to exactly correspond to each other.

Further, in accordance with another feature of the present invention, the cross-sectional configuration of each of the unit optical fiber bundles is made in the form of a regular triangle or a trapezoid in which the bottom side is twice as long as the remaining three sides of the same length and the opposite two sides are inclined symmetrical with respect to the center line of the cross-section so that an included angle of 60° is formed therebetween. By assembling the unit optical fiber bundles, a composite optical fiber bundle having an elongated cross-section with the width corresponding to the height of the above described triangle or the trapezoid or a cross-section in the form of a hexagon can be formed by bonding the assembled unit optical fiber bundles with each other at the respective ends thereof.

In accordance with still another feature of the present invention, the unit optical fiber bundle is constructed by a relatively small number of optical fiber elements such as three or six optical fiber elements which are bonded together through the lengths thereof so that the cross-sectional configuration is made substantially in the form of a regular triangle. To this end, a plurality of optical fiber elements such as three or six optical fiber elements are passed together through a nozzle having the cross-section in the form of a regular triangle and a bonding agent is applied to the optical fiber elements by an applicator located adjacent to the outlet of the nozzle so that the bonding agent penetrates the clearances between the optical fiber elements fed out together from the nozzle and the optical fiber elements are bonded together to form the unit optical fiber bundle with the cross-section thereof being in the triangular form.

The thus obtained unit optical fiber bundle has high tensile strength in comparison with the individual optical fiber element thereby facilitating the assembly of the unit optical fiber bundles without causing the breakage thereof.

A plurality of the thus formed unit optical fiber bundles are assembled in parallel relationship to each other and the respective ends of the thus assembled unit optical fiber bundles are bonded together to form a composite optical fiber bundle. Any desired cross-sectional configuration of the composite optical fiber bundle can be obtained by appropriately selecting the arrangement of the unit optical fiber bundles relative to each other.

A completed optical fiber bundle having the hexagonal cross-section may be obtained by appropriately assembling the optical fiber bundles having the trapezoid cross-section as previously described.

When a thermally fusible bonding agent is used in producing the unit optical fiber bundle having the triangular cross-section, it is not necessary to additionally apply a bonding agent for bonding the unit optical fiber units together at the respective ends thereof.

The above described procedure of producing an optical fiber bundle having a large cross-sectional area is very simple and the thus obtained optical fiber bundle has very high accuracy in the arrangement of each of the optical fiber elements relative to each other at the respective ends of the completed optical fiber bundle.

Since the optical fiber elements in each of the unit optical fiber bundles are bonded together by the bonding agent, the light is transmitted through each of the optical fiber elements so that, even though breakage takes place in some of the optical fiber elements in the unit optical fiber bundle, the light can be transmitted through the remaining optical fiber elements in the unit optical fiber bundle.

DETAILED DESCRIPTION OF THE PREFERRED EMBODIMENTS

Figure 1:
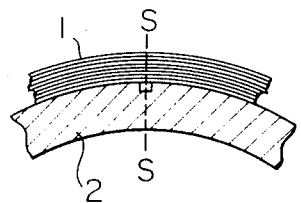
FIG. 1 is a fragmentary view showing a portion of a drum on which an optical fiber element is wound to form a plurality of layers of the optical fiber element forming an optical fiber bundle.
Figure 2:
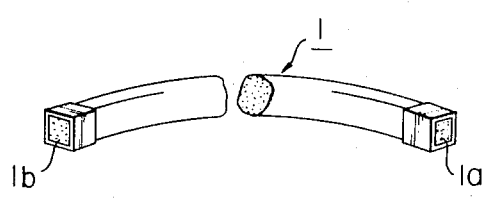
FIG. 2 shows the appearance of an optical fiber bundle.

FIG. 1 shows the conventional manner of producing an optical fiber bundle. At least one optical fiber element 1 is found onto a drum 2 in close contact with each other so as to form a plurality of successively stacked layers of helically, closely wound windings of the optical fiber element 1. A bonding agent is applied at a portion of the layers as shown by S—S so as to fix that portion of the layers. Then, the layers are severed at S—S so that two opposite surfaces 1a and 1b are formed as shown in FIG. 2. Since the arrangement of each of the optical fiber elements 1 at the respective end surfaces 1a and 1b corresponds to each other, the light incident to either of the end surfaces 1a and 1b is transmitted through each of the optical fiber elements 1 to the opposite end surface 1a or 1b without changing the pattern of the distribution of the intensity of light incident to the end surface of the optical fiber bundle.

Figure 3:
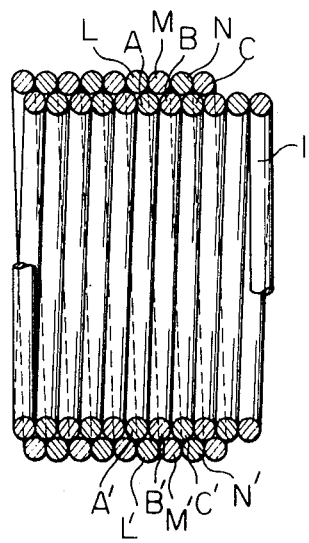
FIG. 3 is a longitudinal sectional view showing the windings of the optical fiber element produced by the prior art method of winding the optical element on a drum.

However, in the prior art method of winding the optical fiber element 1 onto a drum, the drum is rotated in one direction and the optical fiber element 1 is fed axially of the drum from one side thereof to the other side and, after one layer of the optical fiber element 1 is completed, the optical fiber element 1 is fed axially in the opposite direction while the drum is rotated in the same direction so as to form a succeeding layer of the optical fiber element 1 overlying the previously formed layer as shown in FIG. 3. These procedures are repeated so that successively stacked layers of the optical fiber element 1 are formed. However, by such a method, the sense of the helical angle of the windings of one layer is made opposite to that of the adjacent layers. In other words, each of the optical fiber elements 1 in one layer crosses the optical fiber elements 1 in the adjacent layers as shown in FIG. 3. Thus, strictly speaking, the pattern of the distribution of the intensity of light incident to one end surface of the optical fiber bundle does not exactly correspond to that transmitted to the opposite end surface. For example, the light incident to one end M of the optical fiber element located above the two ends A and B of the optical fiber elements of the inner layer intermediate thereof as shown in FIG. 3 is transmitted to the other end M′ which is not located above the ends A′ and B′ of optical fiber elements intermediate thereof but is shifted axially of the windings of the optical fiber elements so as to be located above B′ and C′ intermediate thereof as clearly seen in FIG. 3.

This means that the pattern of the distribution of the intensity of light incident to one end surface of the optical fiber bundle is not exactly transmitted to the opposite end surface but the light transmitted by the respective optical fiber elements in one layer is shifted relative to that of the adjacent layers by the amount corresponding to the diameter of the optical fiber bundle thereby deteriorating the performance of the optical fiber bundle.

In accordance with the present invention, the above described disadvantage is eliminated by a simple method.

Figure 4:
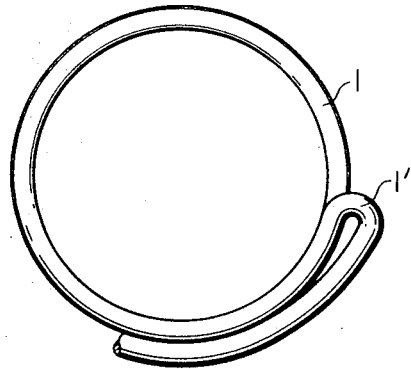
FIGS. 4 and 5 show the method of winding the optical fiber element onto a drum in accordance with the present invention.
Figure 5:
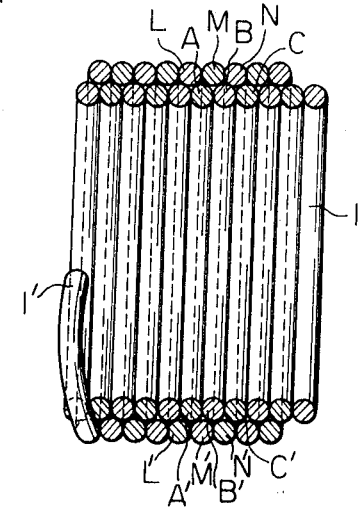

As shown in FIGS. 4 and 5, the optical fiber element 1 is folded back upon itself as shown by the reference numeral 1′ each time one layer of the optical fiber element 1 has been completed by winding the optical fiber element 1 onto the preceding layer formed on a drum which is rotated in one direction while the axial feeding of the optical fiber element supplied to the drum is given in one direction and, at the same time, the rotation of the drum and the direction of the axial feeding of the optical fiber element 1 are reversed so as to form a layer of the optical fiber element 1 onto the layer which has just been completed. Since the optical fiber element 1 is folded back upon itself and is wound on the preceding layer by reversing the direction of the rotation of the drum, the sense of the helical angle of the windings of each of the layers is kept the same without causing the optical fiber element 1 in any of the layers to cross that of the adjacent layers, thereby permitting the optical fiber element 1 to be wound on the preceding layer in close contact with the optical fiber element 1 in the preceding layer, while the pattern of the distribution of the intensity of light incident to either one of the end surfaces is exactly transmitted to the other end surface without causing any distortion of the pattern of the distribution of the intensity of light transmitted through the optical fiber bundle or any alternate relative shifting of the light transmitted through the alternating layers of the optical fiber elements 1.

In FIGS. 4 and 5, a single optical fiber element 1 is shown for forming the layers by winding the same. However, a plurality of optical fiber elements 1 bundled together by means such as thermal adhesion by the fusing thereof or by means of a bonding agent applied to the optical fiber elements 1 through the lengths thereof may be used in place of the single optical fiber element 1.

In case a plurality of optical fiber elements 1 bundled together by means of the bonding agent are used as a unit for forming the layers, dark spots of relatively large cross-sectional area due to the breakage of the optical fiber elements 1 which might appear at the end surface of the optical fiber bundle to which the light is transmitted can be avoided even though one or more of the optical fiber elements 1 in each of the units of the bundled optical fiber elements 1 are broken, because each of the optical fiber elements 1 in each of the units transmits the light individually.

Figure 6:
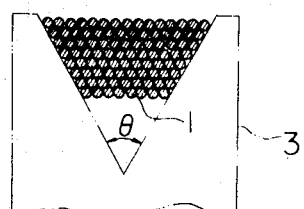
FIG. 6 is a cross-sectional view showing the unit optical fiber element wound in a groove having the trapezoid cross-section.

FIG. 6 shows another embodiment of the present invention in which optical fiber elements 1 are assembled so as to form a trapezoid cross-section having its bottom side twice as long as the remaining three sides of the same length with the included angle θ formed between the two opposite sides being made 60°. Such an arrangement of the optical fiber elements 1 may be obtained, for example, by winding at least one optical fiber element 1 in a circumferential groove formed in the circumferential surface of an annular body 3, the groove having a bottom surface and two opposite side surfaces symmetrically inclined so as to form in cross-section the included angle of 60°, and fixing a portion of the thus formed assembly by means of a bonding agent, and then severing the assembly at the fixed portion as previously described.

The thus formed optical fiber bundle having the trapezoid cross-section may be used as a unit optical fiber bundle.

Figure 7:
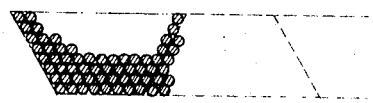
FIG. 7 is a cross-sectional view showing in cross-section the assembled optical fiber bundle having an elongated cross-section constructed by assembling the unit optical fiber bundles shown in FIG. 6.

As shown in FIG. 7, the unit optical fiber bundles as shown in FIG. 6 may be assembled by fixing the respective ends thereof by means of a bonding agent so as to form a composite optical fiber bundle having the elongated cross-section with the thickness thereof corresponding to the height of the above described trapezoid cross-section.

Figure 8:
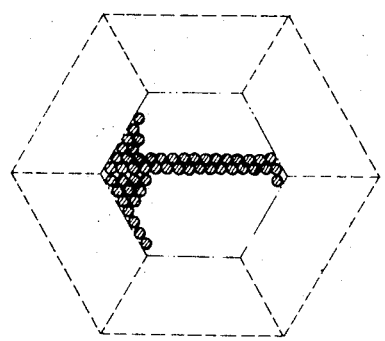
FIG. 8 shows in cross-section the manner how an optical fiber bundle having a hexagonal cross-section is formed by assembling the unit optical fiber bundles shown in FIG. 6.

Alternatively, the unit optical fiber bundles may be assembled so as to form the hexagonal cross-section as shown in FIG. 8.

As shown in FIG. 8, by assembling eight unit optical fiber bundles, a composite optical fiber bundle having a large cross-sectional area in the form of a hexagon can be obtained.

Figure 9:
FIG. 9 is a view similar to FIG. 6 but showing a modification of making a unit optical fiber bundle shown in FIG. 6, the cross-section of the unit optical fiber bundle being made in the regular triangular form instead of being in the trapezoid form.
Figure 10:
FIGS. 10 and 11 are views similar to FIGS. 7 and 8, respectively, but showing the manner of assembling the unit optical fiber bundles shown in FIG. 9.
Figure 11:
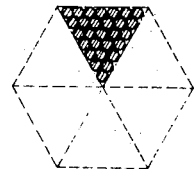

FIGS. 9 to 11 show a modification of the embodiment of FIGS. 6 to 8. In this example, the cross-sectional configuration of the unit optical fiber units is made in the form of a regular triangle. The manner for forming the unit optical fiber bundles and the manner for assembling the same is apparent from FIGS. 6 to 8.

Figure 12:
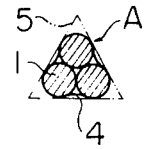
FIG. 12 is a cross-sectional view showing the unit optical fiber bundle comprised of three optical fiber elements bonded together to form substantially a regular triangular cross-section thereof.

FIG. 12 shows further embodiment of the present invention in which three optical fiber elements 1 are bonded together through the lengths thereof by means of a bonding agent 4 so as to form a unit optical fiber bundle A having a cross-section substantially in the form of a regular triangle. This unit optical fiber bundle A may be produced by passing three optical fiber elements 1 through a nozzle 5 having a regular triangular cross-section. The bonding agent 4 is applied to the optical fiber elements 1 by an applicator (not shown) located adjacent to the outlet of the nozzle 5. Thus, the bonding agent 4 penetrates the clearances between the three optical fiber elements 1 through the lengths thereof and solidifies so as to form a unit optical fiber bundle A.

Figure 13:
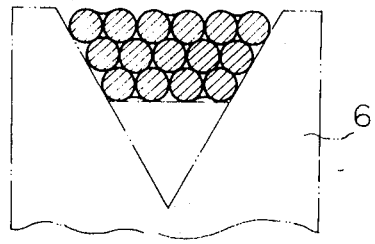
FIG. 13 is a cross-sectional view showing the manner of assembling the unit optical fiber units shown in FIG. 12.

A plurality of such unit optical fiber bundles A may be assembled so as to form a cross-section of the assembly in the trapezoid form as shown in FIG. 13 by using a groove similar to that shown in FIG. 6. When a thermally fusible bonding agent is used for making the unit optical fiber bundle A, the assembly can be easily fixed by merely heating the respective ends of the assembly so as to heat set the respective ends after cooling. The thus formed assembly shown in FIG. 13 may be used for making the composite optical fiber bundle shown in FIG. 7 or FIG. 8.

In assembling the unit optical fiber bundles A, the groove in which the same are located may be formed in the circumferential surface of an annular body 6 as in the case shown in FIG. 6 or the groove may be in the straight form formed in an elongated body in which the unit optical fiber bundles A are located in parallel relationship to each other.

Figure 14:
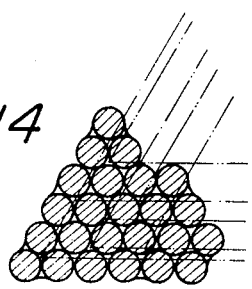
FIG. 14 shows in cross-section the manner how the unit optical fiber units shown in FIG. 12 are assembled.

FIG. 14 shows another arrangement of the unit optical fiber bundles A so as to form a composite optical fiber bundle having a large cross-sectional area.

Since the bonding agent 4 pentrates the clearances between the three optical fiber elements 1 in the unit optical fiber bundle A and does not protrude beyond the boundary defined by the nozzle 4 by virtue of the nature of the bonding agent 4, the arrangement of each of the optical fiber elements 1 by using the unit optical fiber bundles A can be made regular and uniform so that the performance of the completed optical fiber bundle is very high. Further, since the optical fiber elements 1 in each of the unit optical fiber bundles A are bonded together by the bonding agent 4, the light can be transmitted through each of the unit optical fiber bundles A even though one or two of the optical fiber elements 1 incorporated in each of the bundles A are broken.

Figure 15:
FIG. 15 is a view similar to FIG. 12 but showing the cross-section of the unit optical fiber unit comprised of six optical fiber elements.

FIG. 15 shows a modification of FIG. 12, in which six optical fiber elements 1 are incorporated in each of the unit optical fiber bundles. The manner of making the unit bundle shown in FIG. 15 and the manner of assembling the same are similar to those shown in FIGS. 12 to 14.

Since the optical fiber elements 1 in the unit optical fiber bundle as shown in FIGS. 12 and 15 are bonded by the bonding agent 4, the tensile strength of the unit bundle is very high in comparison with individual separate optical fiber elements 1, thereby facilitating the production of the composite optical fiber bundle and preventing the failure in the use of the same.

We claim:

1. Method for producing an optical fiber bundle by winding at least one optical fiber element onto a rotating drum so as to form successively stacked layers each form by helically wound windings of said optical fiber element with the adjacent two windings in close contact with each other, fixing said successively stacked layers of said optical fiber element at a circumferential position on said drum by means of a bonding agent applied thereto, and severing said successively stacked layers at said circumferential position so as to form the optical fiber bundle with the opposite surfaces provided by the severing of said successively stacked layers at said circumferential position serving as the respective end surfaces of said optical fiber bundle, wherein the improvement comprises the steps of winding said at least one optical fiber element onto the drum while it is rotated in one direction so as to form one layer of said optical fiber element, folding back said optical fiber element upon itself at the end of the thus formed one layer of said optical fiber element while the direction of the rotation of said drum is reversed thereby permitting a succeeding layer of said optical fiber element to be formed on the preceding layer of said optical fiber element with the helical angle of the windings of each of the layers being held in the same sense with each other.

2. Method according to claim 1, wherein said at least one optical fiber element comprises a plurality of optical fiber elements thermally adhered with each other so as to form a composite optical fiber.

3. Method according to claim 1, wherein said at least one optical fiber element comprises a plurality of optical fiber elements bonded with each other by means of a bonding agent so as to form a composite optical fiber.

4. Method for producing an optical fiber bundle by winding at least one optical fiber element onto a rotating drum so as to form successively stacked layers each formed by helically wound windings of said optical fiber element with the adjacent two windings in close contact with each other, fixing said successively stacked layers of said optical fiber element at a circumferential position on said drum by means of a bonding agent applied thereto, and severing said successively stacked layers at said circumferential position so as to form the optical fiber bundle with the opposite surfaces provided by the severing of said successively stacked layers at said circumferential position serving as the respective end surfaces of said optical fiber bundle, wherein the improvement comprises the steps of winding said at least one optical fiber element in a V-shaped circumferential groove formed in the circumferential surface of a rotating drum and having the side walls inclined symmetrically with respect to the center line of said groove so as to form therebetween an included angle of 60° thereby permitting a unit optical fiber bundle having its cross-section in the form of a regular triangle to be formed, repeating the formation of said unit optical fiber bundle so as to provide a plurality of the same, and bonding the respective ends of said plurality of said unit optical fiber bundles with each other by means of a bonding agent thereby permitting a composite optical fiber bundle having a large cross-sectional area to be obtained.

5. Method according to claim 4, wherein said unit optical fiber bundles are bonded with each other so as to form a composite optical fiber bundle having an elongated cross-section with the thickness thereof corresponding to the height of the triangular cross-section of said unit optical fiber bundle.

6. Method according to claim 4, wherein said unit optical fiber bundles are bonded with each other so as to form a composite optical fiber bundle having its cross-section in the form of regular hexagon.

7. Method for producing an optical fiber bundle by winding at least one optical fiber element onto a rotating drum so as to form successively stacked layers each formed by helically wound windings of said optical fiber element with the adjacent two windings in close contact with each other, fixing said successively stacked layers of said optical fiber element at a circumferential position on said drum by means of a bonding agent applied thereto, and severing said successively stacked layers at said circumferential position so as to form the optical fiber bundle with the opposite surfaces provided by the severing of said successively stacked layers at said circumferential position serving as the respective end surfaces of said optical fiber bundle, wherein the improvement comprises the steps of winding said at least one optical fiber element in a trapezoid-shaped circumferential groove formed in the circumferential surface of a rotating drum and having a bottom wall and opposite two side walls inclined symmetrically with respect to the center line of the cross-section of said groove so as to form therebetween an included angle of 60° thereby permitting a unit optical fiber bundle having its cross-section in the form of a trapezoid in which the length of the bottom side is two times as long as that of the three other sides of the equal length of the cross-section, repeating the formation of said unit optical fiber bundle so as to provide a plurality of the same, and bonding the respective ends of said plurality of said unit optical fiber bundles with each other by means of a bonding agent thereby permitting a composite optical fiber bundle having a large cross-sectional area to be obtained.

8. Method according to claim 7, wherein said unit optical fiber bundles are bonded with each other so as to form a composite optical fiber bundle having an elongated cross-section with the thickness thereof corresponding to the height of the trapezoid cross-section of said unit optical fiber bundle.

9. Method according to claim 4, wherein said unit optical fiber bundles are bonded with each other so as to form a composite optical fiber bundle having its cross-section in the form of regular hexagon.

10. Method for producing an optical fiber bundle by arranging a plurality of optical fiber elements in parallel relationship and in close contact with each other and fixing the respective ends by means of a bonding agent so that the arrangement of each of the optical fiber elements at the respective ends exactly corresponds to each other, wherein the improvement comprises the steps of forming a plurality of unit optical fiber bundles each having a plurality of optical fiber elements bonded with each other through the length thereof by means of a bonding agent so that the cross-section of the thus bonded optical fiber elements in each of said unit optical fiber bundles is made substantially in the form of a regular triangle, arranging said unit optical fiber bundles in parallel relationship to each other, and fixing the respective ends of the thus arranged unit optical fiber bundles thereby permitting a composite optical fiber bundle having a large cross-sectional area.

11. Method according to claim 10, wherein each of said unit optical fiber bundles comprises three optical fiber elements bonded with each other by passing the same through a nozzle having a triangular cross-section with the bonding agent being applied thereto by a bonding agent applicator located adjacent to said nozzle.

12. Method according to claim 10, wherein each of said unit optical fiber bundles comprises six optical fiber elements bonded with each other by passing the same through a nozzle having a triangular cross-section with the bonding agent being applied thereto by a bonding agent applicator located adjacent to said nozzle.

13. Method according to claim 10, wherein said unit optical fiber bundles are arranged in parallel relationship and in close contact with each other so as to form a composite optical fiber bundle having its cross-section in the form of a trapezoid having its bottom side two times as long as the length of the remaining three sides of the same length with the included angle of 60° being formed between the opposite side walls, the cross-section being symmetrical with respect to the center line thereof.

14. Method according to claim 13, wherein said unit optical fiber bundles are wound in a circumferential groove formed in the circumferential surface of a rotating drum and having a bottom wall and opposite side walls inclined symmetrically with respect to the center line of said groove in the cross-section thereof so that the included angle of 60° is formed therebetween thereby permitting said composite optical fiber bundle to be formed.

15. Method according to claim 13, wherein said unit optical fiber bundles are arranged in an elongated groove having a bottom wall and opposite side walls inclined symmetrically with respect to the center line of said cross-section so that the included angle of 60° is formed therebetween thereby permitting said composite optical fiber bundle to be formed.

16. Method according to claim 13, wherein a plurality of said composite optical fiber bundles are provided which are bonded with each other so that an optical fiber optical bundle having its cross-section in the form of regular hexagon is formed.

References Cited

UNITED STATES PATENTS

| 3,033,731 | 5/1962 | Cole | 156—175 |
|-----------|--------|------|---------|
| 3,104,191 | 9/1963 | Hicks, Jr., et al. | 156—174 |
| 3,215,029 | 11/1965 | Woodcock | 156—174X |
| 3,514,351 | 5/1970 | Mukai | 156—175X |

BENJAMIN R. PADGETT, Primary Examiner

E. E. LEHMANN, Assistant Examiner

U.S. Cl. X.R.

156—175, 182; 350—96